J. H. COLE.
Sulky Plow.
No. 101,435. Patented April 5, 1870.
Figure 1 —
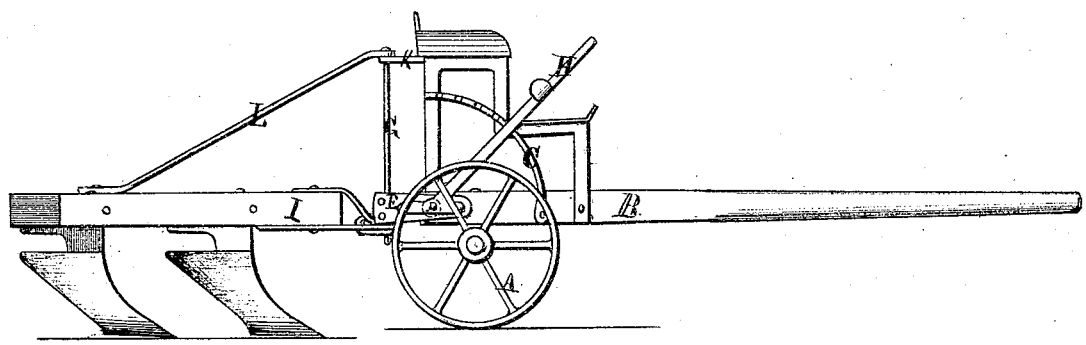
Figure 2 —
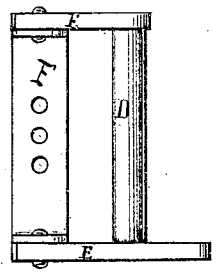

UNITED STATES PATENT OFFICE.

JOHN H. COLE, OF VACAVILLE, CALIFORNIA.

IMPROVEMENT IN SULKY-PLOWS.

Specification forming part of Letters Patent No. 101,435, dated April 5, 1870.

*To all whom it may concern:*

Be it known that I, JOHN H. COLE, of Vacaville, in the county of Solano and State of California, have invented a new and useful Improvement in Plowing-Sulkies; and I do declare that the following is a true and accurate description thereof, reference being had to the accompanying drawings, and to the letters of reference marked thereon, and being a part of this specification.

Figure 1 is a side elevation of my sulky with a gang-plow attached. Fig. 2 is a detached view, showing plan of rock-shaft and attachments.

Like letters refer to like parts in each figure.

The nature of this invention relates to an improvement in the construction of a two-wheeled vehicle so arranged that a gang-plow, cultivator, or other implement may be readily attached thereto and conveniently operated for the purpose for which said implement is designed.

My improvement consists in the combination and arrangement of its several parts, as more particularly described below.

In the drawings, A are suitable traction-wheels rotating on an axle to which is secured a bifurcated tongue, B, surmounted with a suitable seat for the driver. To the side of the frame of said seat is secured the quadrant C. Across the rear end of the tongue a rock-shaft, D, is journaled in suitable bearings, and to each end of said shaft is secured a rock-arm, E.

F is a clevis-plate pivoted in the outer ends of said arms, and is provided with a series of holes, through which and the clevis of the implement to be drawn is passed a suitable coupling-pin or king-bolt, G, where it is desired to allow said implement to have a lateral play. When the implement is to be rigidly attached, additional pins are inserted through coincident holes in its clevis and clevis-plate. Where there is side draft in the implement, the coupling is effected in such a manner as to overcome it by coupling the parts at one side of the line of draft. H is a lever connected to the rock-shaft, so that the clevis-plate may be lowered to gage the depth of furrow, which is regulated by the engagement of the lever with any of the notches in the quadrant. In moving from place to place the points of the plows are raised clear from the ground by throwing down the lever into the lowest notch of the quadrant, which will raise the front end of the frame I of the implement, which will simply allow the heels of the plows to drag on the surface of the ground.

If it is desired to raise the implement entirely above the ground, the king-bolt may be carried up through a socket, K, projecting from the rear of the seat-frame, and at its upper end a swivel-brace, L, is extended and secured to the rear end of the frame of the implement, as shown in Fig. 1.

I do not claim as my invention the employment of any particular form of plow, cultivator, or other implement when attached to a sulky, as herein described; but What I do claim as new, and desire to secure by Letters Patent, is—

The plowing-sulky above described, consisting of the wheels A upon a suitable axle, the tongue B, the quadrant C, the rock-shaft D, the rock-arms E, the clevis-plate F, the king-bolt G, the lever H, the frame I, the socket K, the swivel-brace L, in connection with one or more suitable plows, and provided with a driver's seat, when the several parts are constructed as described, and combined and arranged to operate as and for the purposes set forth.

JOHN H. COLE.

Witnesses:
H. S. SPRAGUE,
GEO. O. MANCHESTER.